United States Patent

[11] 3,556,057

[72] Inventor Paul Icking
Burlo, Westphalia, Germany
[21] Appl. No. 804,136
[22] Filed Mar. 4, 1969
[45] Patented Jan. 19, 1971
[73] Assignee Gebr. Schmeing
Weseke, Kreis Borken, Germany
[32] Priority Mar. 5, 1968
[33] Germany
[31] No. 1,632,997

[54] ANIMAL FEEDING SYSTEM
10 Claims, 3 Drawing Figs.

[52] U.S. Cl. ............................................... 119/51.5,
119/51.11, 119/56
[51] Int. Cl. ............................................... A01k 05/00,
A01k 39/00, A01k 07/02
[50] Field of Search ............................................... 119/51.56,
51.11, 53, 72, 51.5

[56] References Cited
UNITED STATES PATENTS
3,422,799 1/1969 Ruffing .......................... 119/56
3,433,205 3/1969 Pittard .......................... 119/51.5

Primary Examiner—Aldrich F. Medbery
Attorney—McGlew and Toren

ABSTRACT: An arrangement for feeding animals, particularly pigs, includes an endless conveyor which is arranged to withdraw feed from a silo and to deliver it to one or more vertical dosing chutes. The dry feed is dropped downwardly by the chute into a bin or sty and a liquid such as water is added to the dry feed in quantities to control feed dust and to insure that feed is moist enough to be palatable. The liquid feed is characterized by a connection between a main liquid feed conduit and one or more spray pipes arranged around the discharge of the vertical chute to provide the correct amount of liquid such as water to the feed as it is discharged at a feeding station. In order to insure that the correct amount of liquid is fed to the feed which is being discharged, the quantity of liquid which is discharged is regulated to correspond to the quantity of feed which is discharged. The quantity of liquid which is discharged, in one embodiment, is regulated by a collapsible container which collapses during the discharge of water therefrom to the feed and which, when fully collapsed, discontinues further feeding of liquid. Another embodiment includes a measuring valve connected in the feed line to provide the desired liquid feedout.

PATENTED JAN 19 1971

INVENTOR
PAUL ICKING

BY Mallen and Loren
ATTORNEYS

3,556,057

ANIMAL FEEDING SYSTEM

SUMMARY OF THE INVENTION

This invention relates, in general, to the construction of automatic feeding devices for animals and, in particular, to a new and useful device for supplying dry feed and for providing a wetting element for the feed which is fed in proportion to the amount of dry feed which is dispensed.

Automatic arrangements for feeding animals are generally known today and are used particularly in the feeding of pigs. Dry feed is supplied to the animals and in doses which are measured out in accordance with weight or volume and an additional liquid such as water is supplied to the feed. If the feeding of the animals is effected in a feed trough, it is not difficult to add the water to the feed in the trough in an amount such that the feed is better digested by the animals. But if the feed is supplied to the animals in a dry form and must be digested by them in this form, the animal is forced to obtain the necessary additional water from a watering trough. Unless the feed is moistened before it is eaten by the animals, their intake will be poor and this will be particularly so with animals which are at the end of a fattening period because the animals are frequently too lazy to take the water necessary for digesting the feed. This will means that feed residues will be left over. These feed residues are undesirable, since they soil the sty and for the further reason that the animal does not take in the desired quantity of feed so that the breeding process is unnecessarily prolonged.

It was found that if certain admixtures are added to the feed, the appetite of the animals will be increased. Such admixtures consist, for example, of sugar or beef fat and it is not difficult to add these admixtures to the dry feed without soiling the supply tubes, the dosing devices, the closing mechanisms at the feed delivery point, etc. The addition of water to the feed at the charging end of the supply apparatus was found impossible because the entire plant becomes soiled after a short time and will no longer be operable.

The invention is based on the problem of providing an arrangement which permits the supply of completely dry or substantially dry feed to the animal in a feed supply apparatus but to nevertheless provide a certain supply of water shortly before or during the intake of the feed to the animals. It is not desirable that an entire quantity of water should be supplied so that the feed becomes very thin and liquidy but rather that only enough water is added to moisten the feed so that the appetite of the animal is increased and the soiling of the sty is avoided. In accordance with the invention, the disadvantages of the prior art are overcome by feeding a quantity of liquid to the feed which is discharged in a dosing quantity into the sty and in an amount comparable to the amount of feed which has been discharged. It is preferable to provide a water delivery pipe adjoining the main water pipe in the range of each feeding place and the pipes are arranged to deliver liquid preferably parallel to the feed direction, the quantity of liquid being delivered being regulated and directed such that it insures that the feed does not raise any dust and that the liquid intermixes therewith as it is discharged.

In one embodiment of the invention, the liquid is fed through a plurality of hoses arranged around the discharge of a vertical feed chute. In still another embodiment, the liquid is added in the form of an annular spray directed downwardly from a ring conduit. The ring conduit may be arranged at the upper end of a dust pipe or chute so that the water trickles down in the outside to form a protective water veil or screen.

In the further aspect of the invention, the water for the feed is connected through delivery pipes having riser bends which extend upwardly to the main pipe. The construction is such that when a regulating device provided in the delivery pipe is opened, the water contained in the main water pipe can feed into the delivery apparatus only in a controlled quantity regulated by the riser bends which permit an outflow only when the water delivery pipe is opened and there is pressure in the main water feed line.

The water delivery system may include a delivery pipe connected to a vessel with means for regulating its volume and which has an outlet which is opened before the feed is delivered. The main water pipe is closed at the same time in order to prevent any further water supply. The vessel of regulatable volume may be arranged next to the delivery water pipe and actuated so that when the feed is released water is forced out of the vessel into the water delivery pipe, but the main water pipe is maintained closed to prevent any further supply of water.

The apparatus permits regulation of the feed either by weight or by volume. A throttle which can be regulated in respect to flow per unit of time is advantageously arranged in the feed pipe to operate in conjunction with a shutoff valve in the main water supply which is opened when the feed is released and closed at the end of the feed delivery.

Accordingly, it is an object of the invention to provide an improved device for automatically dispensing a selected quantity of feed into a feeding location such as a sty and wherein means are also provided for automatically dosing the feed which is discharged with a quantity of water regulated to produce a desired moistening condition of the feed.

A further object of the invention is to provide a plant-feeding system which includes a continuously operable feeding trough for feeding feed material from the silo to one or more vertical chutes and including a liquid supply arrangement comprising a plurality of tubes arranged around the chute and having means for discharging water in the form of a vertical spray around the feed which is discharged from the chute, and further including means for regulating the quantity of liquid which is directed downwardly in the form of a spray connected between a main feed line and a delivery conduit.

A further object of the invention is to provide a feeding device which is simple in design, rugged in construction and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
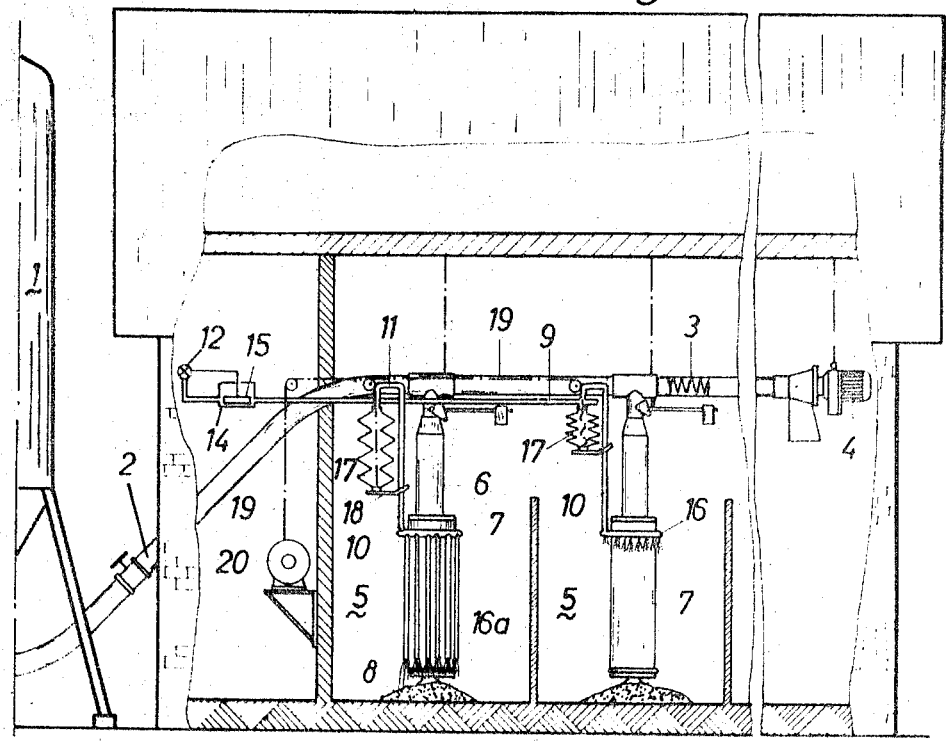
FIG. 1 is a side elevational view partly broken away and partly schematic of a pig sty feeding system constructed in accordance with the invention.

Referring to the drawings, in particular, the invention embodied therein as indicated in FIG. 1 comprises an outer silo or food storage 1 which is connected at its outlet end by a feed supply conveyor or delivery apparatus 2 having a conveyor screw therein for conveying the feed from the discharge end of the silo to the individual delivery points. The drive of the screw 3 is effected by means of an electric motor 4 arranged at the interior of the feeding enclosure. The feeding apparatus is arranged above a plurality of pig sties 5 and it includes a vertical chute or dosing device 6 for each sty. The outlet end of the vertical chutes 6 is connected to a protective dust pipe 7 and the feed which is discharged collects in the form of a heap 8 in the sties 5.

In accordance with the invention, a main water pipe 9 extends above the sties substantially parallel to the feeding supply apparatus 2 and is connected in the range of each dosing device 6 to a water delivery pipe 10. The connection of the water delivery pipe 10 to the main pipe 9 is effected through a riser bend 11. The "riser bend 11" is constructed so that when the main water pipe 9 is closed and the water delivery pipe 10 is opened, the water contained in the main water pipe cannot flow out through the opening of the delivery pipe. The shutoff valve 12 is connected into the main water pipe 9 and it operates in association with a float valve 15 which is arranged to float in a vessel 14.

The water which is discharged from the delivery pipe 10 passes through a ring conduit 16, as indicated to the right of FIG. 1, which is provided with a plurality of discharge openings through which the water issues downwardly in the form of a spray. In this embodiment, the ring conduit 16 is arranged at the upper end of the dust pipe 7 so that the water running from the conduit will flow along the pipe and wet the feed which issues at the bottom of the dust pipe and fails downwardly into the heap 8.

In the other embodiment represented in FIG. 1, the delivery pipe 10 connects to a plurality of small flexible tubes or hoses 16a which terminate adjacent the lower end of the dust pipe 7.

In the embodiment indicated in FIG. 1, means are provided which are associated with the conduit 10 for regulating the amount of water which will be discharged with each dose of feed. The means comprises a vessel 17 which may be adjusted in respect to its volume and is constructed in the form of a bellows which may be collapsed. The vessel 17 carries a clamping device 18 which can be adjusted on the water delivery pipe 10 in accordance with a selected setting as determined by graduations defined on this pipe. The size of the volume contained in the vessel 17 is regulated by such adjustment. Inside the vessel, there is provided a chain or cable line 19 which leads to a central control motor 20. The length of this chain or cable 19 corresponds to the maximum extended length of the vessel. It can be seen that the first vessel 17 represented in FIG. 1 has a substantially greater volume in respect to the conveying direction than the vessel 17 located downstream thereof (on the right-hand side shown in the drawing).

The method of operation of the device is as follows:

Simultaneously with the opening of the discharge outlet of the dosing device 6, the motor 20 is started so that the cable line is pulled. By pulling the cable line 19, the compressible vessel 17 is reduced in its volume and the water contained in the vessel is forced to flow through the water delivery pipe 10 to the ring conduit 16 or the flexible hoses 16a. A return flow of the water from the main water pipe 9 will not be possible because when the cable line 19 is pulled and the vessel 17 compressed, the float 15 will be caused to rise in the vessel 14 and shutoff the supply valve 12. A further rise of the float is not possible because the float is arranged in a vessel of a height selected to correspond to that of the riser bends 11 so that the water can issue through the delivery pipe 10 only to the quantity desired. Because of the riser bends 11, however, only the water forced out of the vessel 17 will be fed to the delivery pipe 10.

Figure 2:
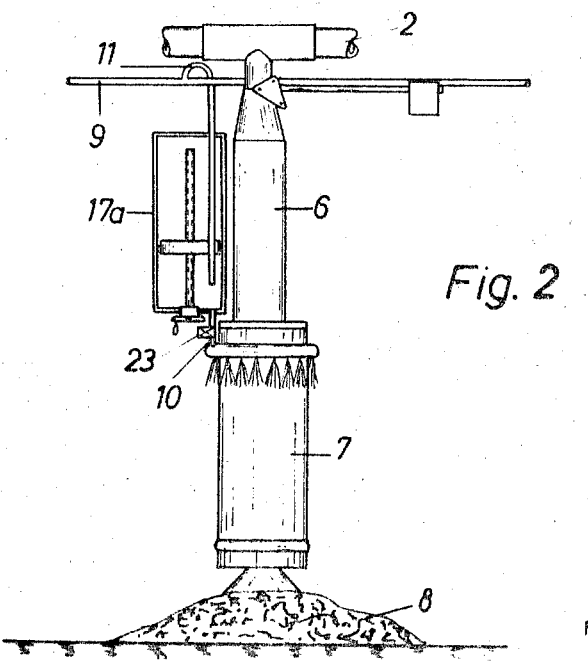
FIG. 2 is an enlarged partial elevational view of the solid feed chute with a liquid spray attachment according to another embodiment of the invention.

In the embodiment indicated in FIG. 2, there is provided a vessel 17a which is adjustable in volume and which is attached directly to the water delivery pipe 10. In this arrangement, control is effected in a manner such that when the feed supply apparatus is opened a flow valve 23 in the delivery pipe 10 will be opened, while at the same time, the regulating valve 12, as indicated in FIG. 1, in the main supply line will be shut. Due to the fact that the water delivery pipe 10 is connected through a riser 11 to the main water pipe 9, the water contained in the main water pipe cannot flow out so that a satisfactory regulation in the amount of water to be added to the feed pipe is possible.

Figure 3:
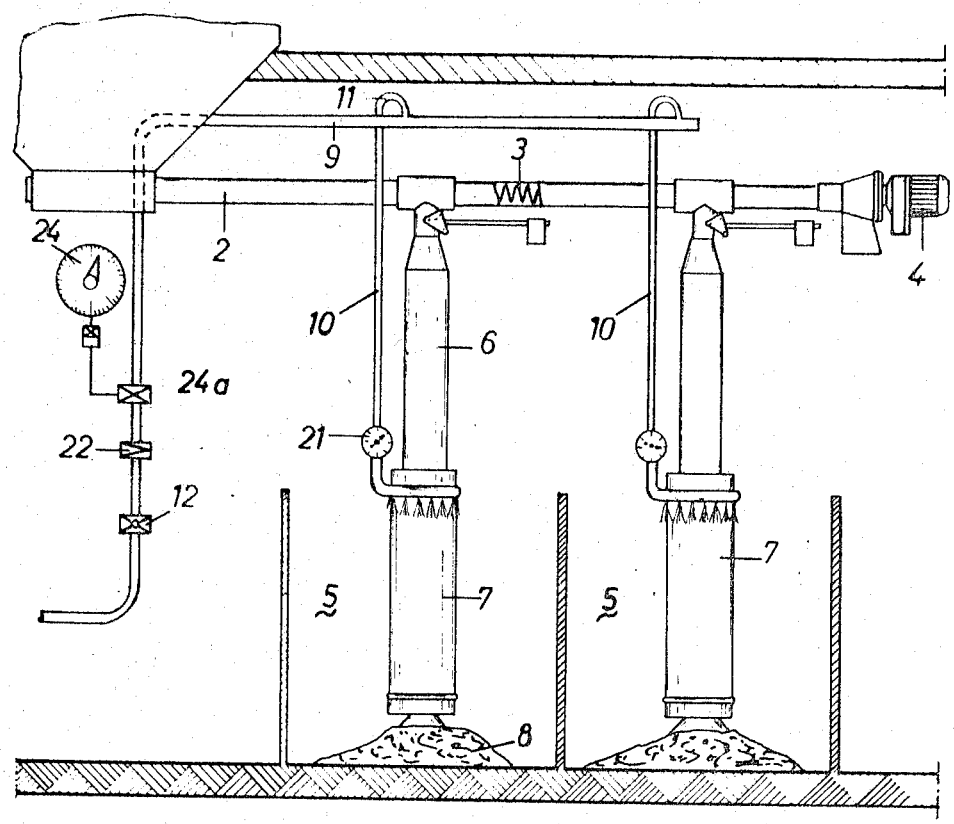
FIG. 3 is a view similar to FIG. 2 of still another embodiment of the invention.

In FIG. 3, there is shown another embodiment in which the regulation in the amount of water is not effected by the vessel, but can be varied in accordance with weight or volume by a throttle 21 arranged in the water delivery pipe 10. The throttle 21 regulates the rate of flow of the water per unit of time. This plant works so that the pressure reducing valve 22 is installed in the main water pipe 9. This insures a constant pressure in the following main water pipe section. A valve 24a arranged in the main water pipe 9 and controlled through an automatic switching device such as a clock 24 is actuated to produce a regulatable amount of water from the feed pipe to the delivery pipe for each selected dosage.

It can be seen that an amount of water adapted to the respective amount of feed can be supplied to the feed which issues from the perspective dust pipe so that the dry feed dosage is supplied with a quantity of water to cause the feed to become only wet enough to stimulate the appetite of the animal and without soiling the sty.

I claim:

1. An animal feeding system for delivering a digestible feed to one or more animal feeding stations, comprising a tubular conduit for conveying substantially dry feed from a hopper to a feeding station, conveyor means associated with said conduit for advancing the feed therealong, at least one substantially vertically arranged feeding chute connected to said conduit and extending downwardly therefrom to a feeding station and adapted to receive the feed being advanced through said conduit and deliver it to the feeding station, and means surrounding said feeding chute for delivering dosable amounts of water around the periphery of said feed chute to the feed which is discharged from the chute at the feeding station.

2. An animal feeding system, according to claim 1, wherein said means for delivering a dosable amount of water to said feed discharged by the chute at the feeding station includes a main water pipe extending along said conveyor, and a separate feed delivery pipe for each feeding station connected to said main water pipe and extending to the feeding station and having means for regulating the quantity of water which is discharged therefrom at the feeding station.

3. An animal feeding system, according to claim 1, including a protective dust pipe extending downwardly from said chute, said means for delivering dosable amounts of water including a water conduit ring extending around said dust pipe and having a plurality of discharge openings for directing water downwardly in a spray around said dust pipe into the feed issuing from the dust pipe.

4. An animal feeding system, according to claim 1, wherein said means for delivering dosable amounts of water includes a main feed conduit extending to said feeding chute, a delivery conduit connected to said main water feed conduit and including a ring conduit extending around said delivery chute, a plurality of individual "tubes" extending downwardly from said ring conduit and terminating into discharges adjacent the lower end of said delivery chute for directing the water onto the feed which exits from said delivery chute.

5. An animal feeding system, according to claim 1, wherein said means for delivering dosable amounts of water to the feed includes an annular ring conduit adjacent said feeding chute, a dust tube extending downwardly from said feeding tube, said ring conduit being arranged to discharge water over the surface of said dust tube to permit it to trickle downwardly onto the feed exiting therefrom.

6. An animal feeding system, according to claim 1, wherein said means for delivering dosable amounts of water to the feed includes a main feed pipe, a riser bend connected to said main feed pipe and extending downwardly through a discharge adjacent the feed being discharged from said feeding chute, and means associated with said riser bend for regulating the quantity of water which is fed therethrough to the discharge.

7. An animal feeding system, according to claim 6, wherein said means for regulating the quantity of water which is discharged through the discharge includes a "collapsible vessel," means for extending the vessel to fill the vessel with water from the main feed pipe, and means for collapsing the vessel during operation to discharge only the quantity of liquid therein through the discharge.

8. An animal feeding system, according to claim 7, including a driving motor connected to said vessel for collapsing the vessel during operation thereof, and means associated with said main feed water conduit for cutting off the supply of water to said conduit after said vessel is moved in a collapsing direction.

9. An animal feeding system, according to claim 1, wherein said means for delivering dosable amounts of water to the feed includes a main conduit, an adjustable vessel located adjacent said main conduit and having a discharge for discharging water to the feed which is directed out of said feeding chute, a connecting pipe extending from said main feed conduit to said vessel, and means for adjusting said vessel in respect to the discharge of the connecting pipe for varying the quantity of liquid which will be fed to said vessel and which will be discharged into the feed.

10. An animal feeding system, according to claim 1, wherein said means for delivering a dosable amount of water to the feed includes a main supply pipe for water extending to said delivery chute, a delivery pipe extending from said main supply pipe and having a discharge arranged adjacent the discharge of the feed from said feeding chute, a shut-off valve connected in said main water feed pipe, and a throttle valve in said delivery pipe having means for permitting a selected quantity of water to flow per unit of time therethrough.